United States Patent [19]

Delprato et al.

[11] Patent Number: 5,441,858
[45] Date of Patent: Aug. 15, 1995

[54] PHOTOGRAPHIC SILVER HALIDE ELEMENTS COMPRISING INFRARED SENSITIZING DYES

[75] Inventors: Ivano Delprato, Rocchetta Di Cairo Montenotte; Sergio Massirio, Finale Ligure; Massimo Bertoldi, Fossano, all of Italy

[73] Assignee: Minnesota Mining and Manufacturing Company, St. Paul, Minn.

[21] Appl. No.: 302,224

[22] Filed: Sep. 6, 1994

Related U.S. Application Data

[63] Continuation of Ser. No. 126,984, Sep. 27, 1993, abandoned.

[30] Foreign Application Priority Data

Oct. 30, 1992 [IT] Italy .............................. MI92A02499

[51] Int. Cl.$^6$ .................................................. G03C 1/20
[52] U.S. Cl. ................................. 430/508; 430/584; 430/944
[58] Field of Search ......................... 430/508, 584, 944

[56] References Cited

U.S. PATENT DOCUMENTS

| | | | |
|---|---|---|---|
| 3,482,978 | 12/1969 | Fumia et al. | 430/522 |
| 3,506,655 | 4/1970 | Jeffreys | 430/580 |
| 3,552,974 | 1/1971 | Jeffreys | 430/580 |
| 3,623,881 | 11/1971 | Fumia et al. | 430/578 |
| 3,671,648 | 6/1972 | Fumia et al. | 430/522 |
| 3,753,721 | 8/1973 | Millikan et al. | 430/581 |
| 3,758,461 | 9/1973 | Fumia et al. | 430/578 |
| 4,011,083 | 3/1977 | Durning et al. | 430/584 |
| 4,536,473 | 8/1985 | Mihara | 430/575 |
| 4,619,892 | 10/1986 | Simpson et al. | 430/508 |
| 4,959,294 | 9/1990 | Lea et al. | 430/204 |
| 5,061,618 | 10/1991 | Parton et al. | 430/584 |
| 5,166,047 | 11/1992 | Hioki et al. | 430/584 |

FOREIGN PATENT DOCUMENTS 0329298  8/1989  European Pat. Off. .
2191151  1/1974  France .

OTHER PUBLICATIONS

Chemical Abstracts 121755k, v. 80, 1974.

Primary Examiner—Janet C. Baxter
Attorney, Agent, or Firm—Gary L. Griswold; Walter N. Kirn; Mark A. Litman

[57] ABSTRACT

Silver halide photographic element comprising a support and at least one silver halide emulsion layer, characterised in that said silver halide emulsion layer is spectrally sensitized to infrared radiation with a tricarbocyanine dye having the formula:

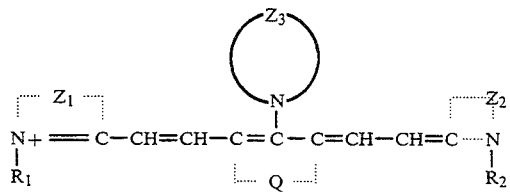

wherein, $Z_1$ and $Z_2$ each independently represents the atoms necessary to complete a thiazole nucleus or an oxazole nucleus, $Z_3$ represents the atoms necessary to complete a 5-membered N-containing aromatic ring, Q represents the atoms necessary to complete a 5- or 6-membered carbocyclic ring, $R_1$ and $R_2$ each independently represents an alkyl group, $X^-$ represents an anion, and n represents an integer of 1 to 2, provided that n is 1 when the dye forms an intramolecular salt.

10 Claims, No Drawings

PHOTOGRAPHIC SILVER HALIDE ELEMENTS COMPRISING INFRARED SENSITIZING DYES

This is a continuation of application Ser. No. 08/126,984 filed on Sep. 27, 1993, now abandoned.

FIELD OF THE INVENTION

This invention relates to photographic silver halide elements and, more particularly, to photographic silver halide elements spectrally sensitised to infrared radiation with tricarbocyanine dyes.

BACKGROUND OF THE ART

It is well known that silver halide photographic elements can be spectrally sensitized to infrared radiation. See Mees and James, *The Theory of Photographic Processes*, 3rd edition, The MacMillan Company, 1966, pages 198 and 199. Silver halides are intrinsically sensitive only to light in the blue region of the spectrum. Therefore, when silver halides are to be exposed to other wavelengths of radiation, such as green light, red light or infrared radiation, a spectral sensitizing dye is required to render silver halide sensitive to such radiation. As known in the art, silver halides having adsorbed on the grains spectral sensitizing dyes can be made sensitive to radiation of a wavelength other than the intrinsic blue sensitivity.

With the advent of lasers, and particularly solid state laser diodes emitting in the infrared region of the spectrum (e.g. 750 to 1500 nm), the interest in infrared sensitization has greatly increased. Many different processes and articles useful for exposure to laser diodes have been proposed. These include C.A.T. (Computer Assisted Tomography) scanners, graphic arts products and infared sensitive false colour-sensitized photographic elements as described in U.S. Pat. No. 4,619,892. In this patent, photographic elements are described which are capable of providing full colour images without exposure to corresponding visible radiation. This false address elements comprise at least three silver halide emulsions layers on a substrate, each associated with different photographic color image forming materials and sensitized to three different portions of the spectrum with at least two layers sensitized to different regions of the infrared region of the spectrum.

There are numerous references to dye structures for infrared sensitizing dyes. Examples of patents disclosing such dyes are listed in U.S. Pat. No. 4,011,083. The most common infrared sensitizing dyes are tricarbocyanine dyes. "Tricarbocyanine" is a term used in the art to include dyes having an amidinium-ion chromophoric system (see Mees and James above, page 201). Typically, such dyes have two nitrogen containing heterocyclic nuclei which are joined by a straight chain methine linkage having seven methine groups. The carbon atom of the central methine group is referred to herein as the meso carbon atom of the methine linkage. Said methine chain is represented by the formula:

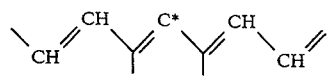

wherein the carbon atom marked with the asterisk is the meso carbon atom. Tricarbocyanine infrared sensitizing dyes having a 4-quinoline nucleus are described in U.S. Pat. No. 4,536,473. Benzoxazole tricarbocyanine infrared sensitizing dyes having a halogen atom attached to the meso carbon atom are described in U.S. Pat. No. 4,959,294. Tricarbocyanine infrared sensitizing dyes containing an amino group attached to the meso carbon atom are described in U.S. Pat. Nos. 3,482,978 and 3,671,648. Tricarbocyanine infrared desensitizing dyes containing cyclic amino group (such as pyrrolidino, piperidino and morpholino) attached through the nitrogen atom to the meso carbon atom of the methine linkage of the dye are described in U.S. Pat. Nos. 3,506,655 and 3,552,974. Tricarbocyanine infrared sensitizing dyes having a piperazinyl group attached through the nitrogen atom to the meso carbon atom of the methine linkage of the dye are described in U.S. Pat. Nos. 3,623,881 and 3,758,461.

Many infrared sensitizing dyes described in the prior art, however, are of limited utility for use in silver halide photographic elements intended for exposure to infrared radiation. Some dyes, especially those having an amino group attached to the meso carbon atom of tricarbocyanine dyes, exhibit a large hyprochromic shift of the absorption maximum and a sensitization wavelength not deep enough in the infrared region. Some dyes exhibit a broad absorbance spectrum which gives to the silver halide photographic element unwanted sensitivity in regions of the spectrum other than that of the emission of laser diodes, resulting in poor colour separation between layers of elements having multiple infrared sensitive layers (such as those described in U.S. Pat. No. 4,619,892). Another problem with many known infrared sensitizing dyes is the poor stability of their solutions during keeping which renders them of limited utility in making photographic elements. U.S. Pat. No. 5,061,618 discloses infrared sensitizing dyes of improved performance, but advises against tricarbocyanine dyes having an heterocyclic ring attached to the meso carbon atom of the methine linkage directly through an heteroatom (such as a nitrogen atom).

SUMMARY OF THE INVENTION

According to the present invention there is provided a silver halide photographic element comprising a support and at least one silver halide emulsion layer spectrally sensitised to infrared radiation with a tricarbocyanine dye having the formula:

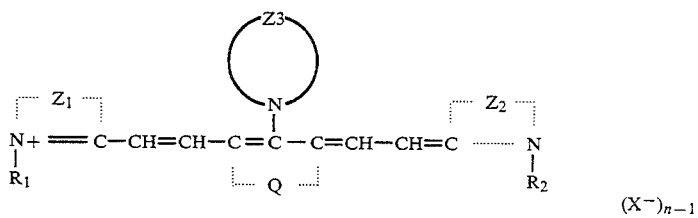

wherein, $Z_1$ and $Z_2$ each independently represents the atoms necessary to complete a substituted or unsubstituted thiazole nucleus or a substituted or unsubstituted oxazole nucleus, $Z_3$ represents the atoms necessary to complete a substituted or unsubstituted 5-membered N-containing aromatic ring, Q represents the atoms necessary to complete a substituted or unsubstituted 5- or 6-membered carbocyclic ring, $R_1$ and $R_2$ each independently represents a substituted or unsubstituted alkyl group, $X^-$ represents an anion, and n represents an integer of 1 to 2, provided that n is 1 when the dye forms an intramolecular salt.

The dyes of the present invention exhibit good stability and deep and narrow sensitization of silver halides to infrared radiation.

DETAILED DESCRIPTION OF THE INVENTION

In the formula of the infrared sensitizing dyes of the present invention, $Z_1$ and $Z_2$ each independently represents the atoms necessary to complete a substituted or unsubstituted thiazole nucleus or oxazole nucleus. These nuclei may be substituted by any of a number of groups known to be substituents for such nuclei. These includes sulfo, halogen (e.g. chloro, fluoro), alkyl of 1 to 12 carbon atoms (preferably of about 1 to 4 carbon atoms, e.g. methyl, ethyl, butyl, which may themselves be substituted with known elements such as hydroxy, halogen or sulfo), alkoxy of 1 to 12 carbon atoms (preferably of about 1 to 4 carbon atoms, e.g. methoxy, ethoxy, butoxy), carboxy, carboxylate of from 1 to 4 carbon atom (e.g. methyl ester, ethyl ester), sulfonamido or carbonamido. Examples of useful nuclei for $Z_1$ and $Z_2$ include a thiazole nucleus, e.g. thiazole, 4-methylthiazole, 4-phenylthiazole, 5-methylthiazole, 5-phenylthiazole, 4,5-dimethyl-thiazole, 4,5-diphenylthiazole, 4-(2-thienyl)-thiazole, benzothiazole, 4-chlorobenzothiazole, 5-chlorobenzothiazole, 6-chloro-benzothiazole, 7-chlorobenzothiazole, 4-methylbenzothiazole, 5-methyl-benzothiazole, 6-methylbenzothiazole, 5-bromobenzothiazole, 6-bromo-benzothiazole, 5-phenylbenzothiazole, 6-phenylbenzothiazole, 4-methoxy-benzothiazole, 5-methoxybenzothiazole, 6-methoxybenzothiazole, 5-iodo-benzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho-(2,1-d)-thiazole, naphtho-(1,2-d)-thiazole, 5-methoxy-naphtho-(2,3-d)-thiazole, 5- ethoxynaphtho-(2,3-d)-thiazole, 8-methoxy-naphtho-(2,3-d)-thiazole, 7-methoxy-naphtho-(2,3-d)-thiazole, 4'-methoxy-thianaphtheno-7',6'-4,5-thiazole, etc., or an oxazole nucleus, e.g. 4-methyloxazole, 4-phenyloxazole, 5-methyloxazole, 4,5-diphenyloxazole, 4-ethyloxazole, 4,5-dimethyloxazole, 5-phenyloxazole, etc., a benzoxazole nucleus, e.g. benzoxazole, 5-chlorobenzoxazole, 5'-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc., a naphthoxazole nucleus, e.g. α-naphth-oxazole, β-naphthoxazole, etc.

$Z_3$ represents the atoms necessary to complete a substituted or unsubstituted 5-membered N-containing aromatic ring. Said heterocyclic aromatic ring includes two conjugated double bonds in the ring. The aromatic character of said heterocyclic rings is well known in the chemical literature, as described for example in S. H. Pine, *Organic Chemistry*, Fifth Edition, MacCraw-Hill Book Company, 1987, page 703. This ring may be substituted as known in the art. Examples of substituents include alkyl such as alkyl from 1 to 4 carbon atoms (e.g. methyl, ethyl, butyl), which may themselves be substituted with known elements such as hydroxy, halogen and the like (e.g., hydroxyethyl, chloroethyl), carboxylate of from 1 to 4 carbon atom (e.g., methyl ester, ethyl ester), amido, sulfonamido, halogen (e.g., chloro, fluoro) and others that would be known to one skilled in the art. Preferred examples of 5-membered N-containing aromatic ring include pyrazole, triazole, imidazole and pyrrole.

Q represents the atoms necessary to complete a substituted or unsubstituted 5- or 6-membered carbocyclic ring, preferably a 6-membered carbocyclic ring. This ring can be substituted, as known to one skilled in the art. Examples of substituents include substituted or unsubstituted alkyl of 1 to 12 carbon atoms (e.g., methyl, ethyl, propyl, chloroethyl, benzyl), substituted or unsubstituted aryl (e.g., phenyl, p-chlorophenyl), halogen (e.g., chloro, fluoro), hydroxy, alkoxy (e.g., methoxy, ethoxy) and other conventional dyes substituents that would be apparent to one skilled in the art.

$R_1$ and $R_2$ each independently represents a substituted or unsubstituted alkyl of 1 to 20 carbon atoms (preferably of from 1 to 6 carbon atoms). Examples of alkyl include methyl, ethyl, propyl, isopropyl, butyl, octyl, etc. and substituted alkyl groups (preferably a substituted lower alkyl of from 1 to 6 carbon atoms), such as a hydroxyalkyl group, e.g., β-hydroxyethyl, γ-hydroxypropyl, δ-hydroxybutyl, etc., a carboxyalkyl group, e.g., β-carboxyethyl, γ-carboxypropyl, etc., a sulfoalkyl group, e.g., β-sulfoethyl, γ-sulfopropyl, δ-sulfobutyl, γ-sulfobutyl, etc., a sulfatoalkyl group, e.g., β-sulfatoethyl, γ-sulfatopropyl, etc., or an acyloxyalkyl group, e.g., β-acetoxyethyl, γ-acetoxypropyl, δ-propoxypropyl, etc.

The anion represented by $X^-$, although not particularly restricted, is, for example, a halogen ion (e.g., chloride, bromide, iodide), p-toluene sulfonate ($PTS^-$), ethylsulfonate, perchlorate, or the like.

When the term "group" or "nucleus" is used in this invention to describe a chemical compound or substituent, the described chemical material includes the basic group or nucleus and that group or nucleus with conventional substitution. Where the term "moiety" is used to describe a chemical compound or substituent, only the unsubstituted chemical material is intended to be included. For example, "alkyl group" includes not only such alkyl moieties as methyl, ethyl, octyl, stearyl, etc., but also such moieties bearing substituents groups such as halogen, cyano, hydroxyl, nitro, amine, carboxylate, etc. On the other hand, "alkyl moiety" or "alkyl" includes only methyl, ethyl, octyl, stearyl, cyclohexyl, etc.

Examples of infrared sensitizing dyes according to this invention include the following. However, the scope of this invention is not limited to these compounds.

Dye 1
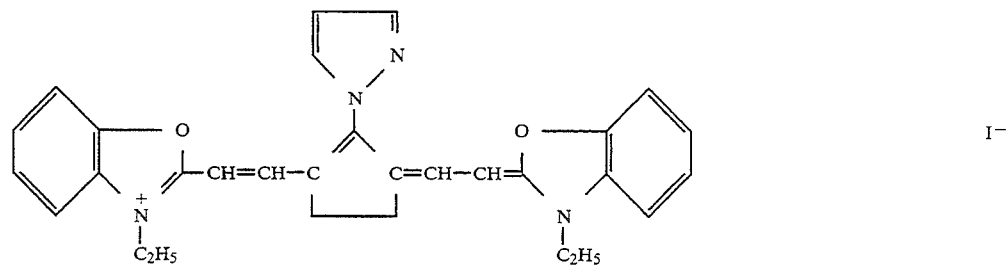 I⁻
Dye 2
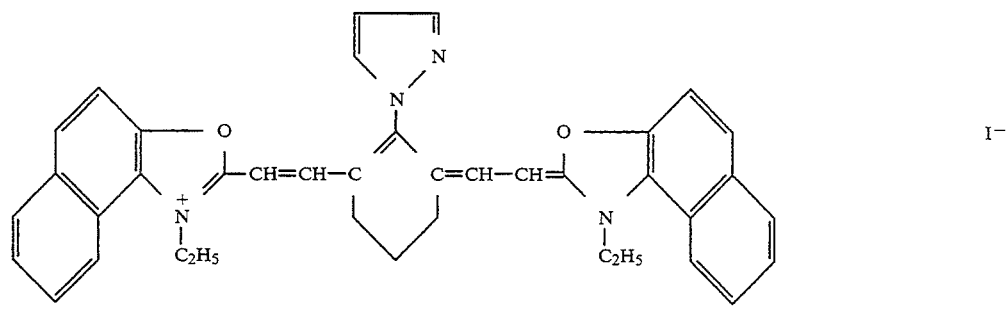 I⁻
Dye 3
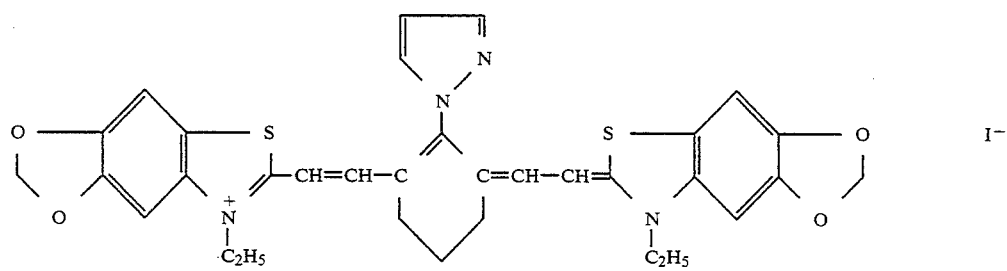 I⁻
Dye 4
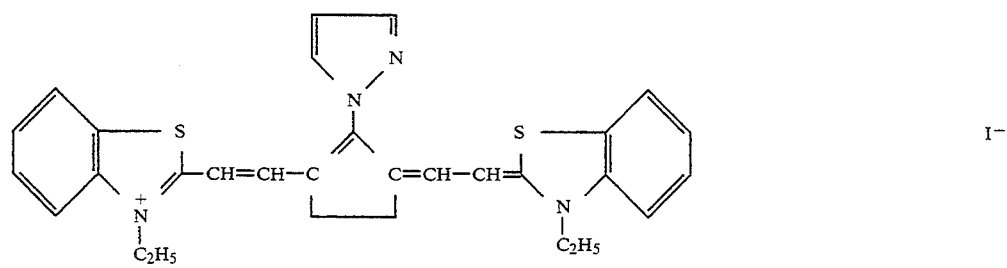 I⁻
Dye 5
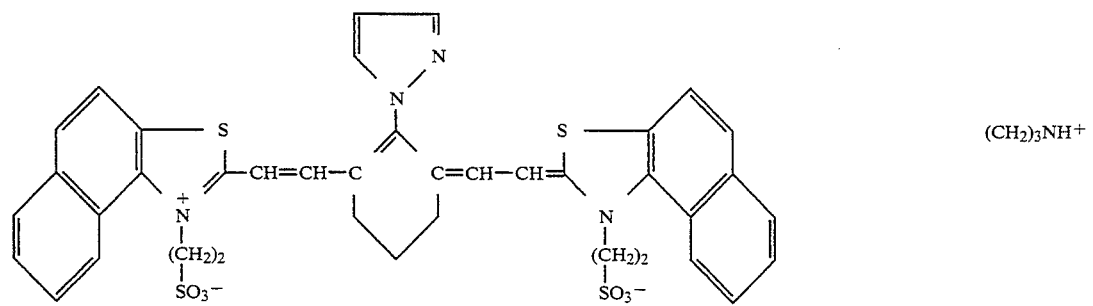 (CH$_2$)$_3$NH⁺
Dye 6

-continued
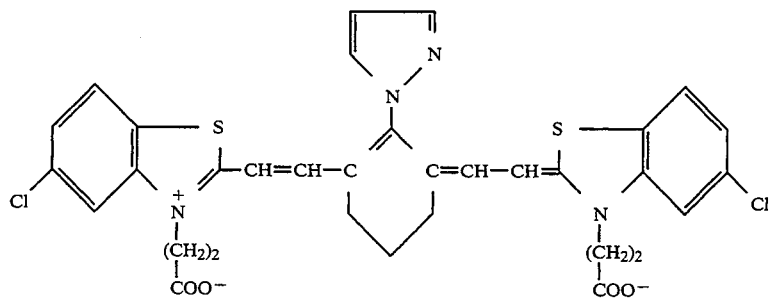
Dye 7     I⁻
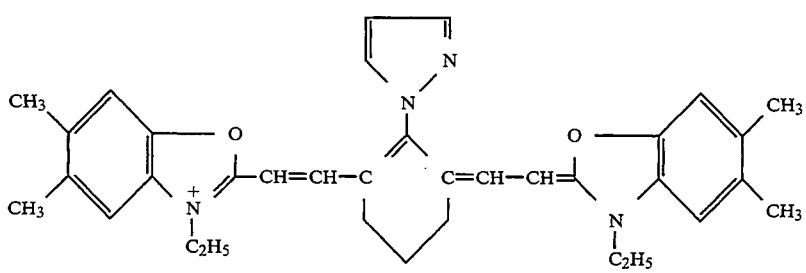
Dye 8     I⁻
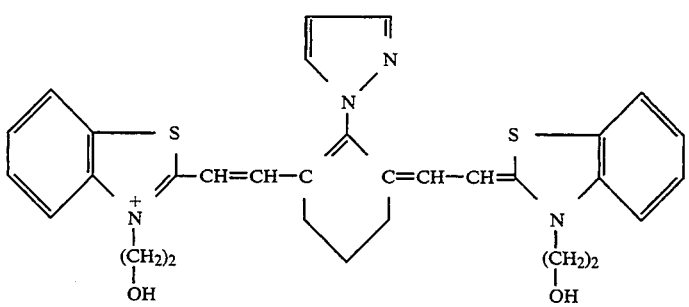
Dye 9     ClO₄⁻
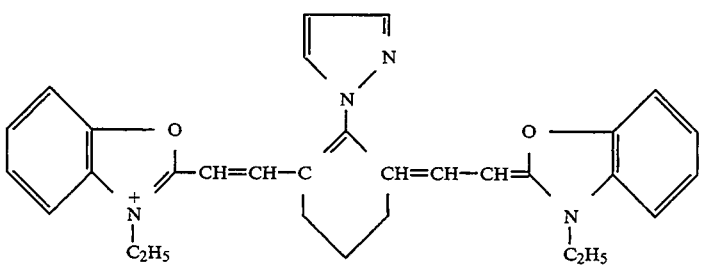
Dye 10     ClO₄⁻
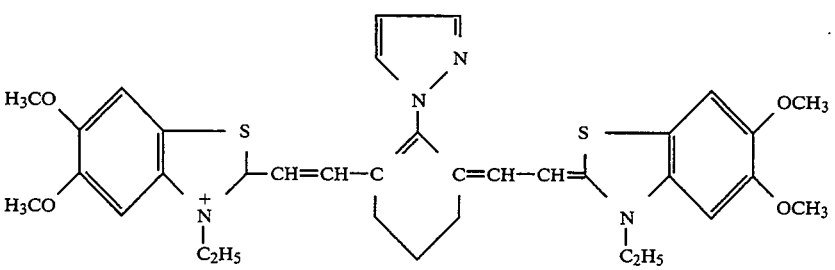
Dye 11     PF₆⁻

-continued

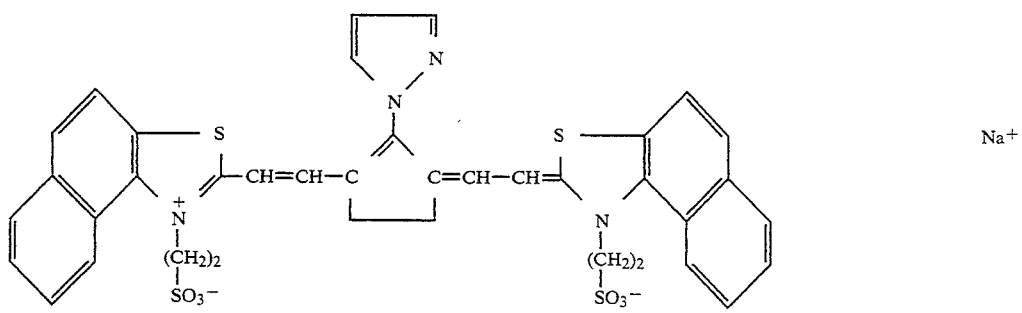

Dye 12

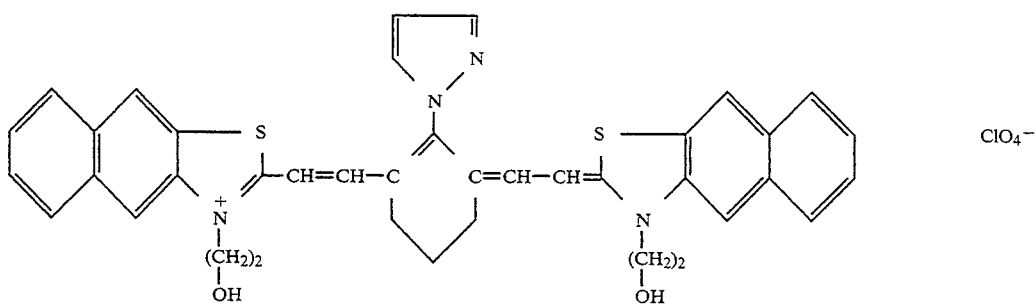

Dye 13

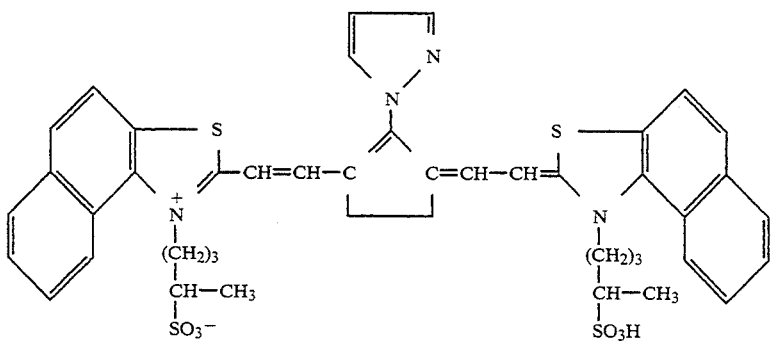

The tricarbocyanine dyes for use in the present invention can be prepared according to well-known procedures in the art, such those described in James, *The Theory of Photographic Processes*, MacMillan, 4th Edition, 1977, in U.S. Pat. Nos. 2,734,900, 3,148,187, 2,895,955 and 3,423,207, in CA 56 114571 and J.Org. Chem., Vol 42, 1977, page 885. Synthetic techniques are also described by Y. L. Slominskii et al, UKR. Khim. Zh., 40, pages 625–629, 1974 and Zh. Org. Khim., 15, page 400, 1979. Preparation processes of such dyes are illustrated in the examples herein below. Variations in the structures of the final dyes may be made by the appropriate selection of reagents and the use of these varied methods.

The tricarbocyanine dyes used in the present invention spectrally sensitize silver halide emulsions to radiation in the infrared from 700 nm upwards, especially from 750 to 850 nm, to provide photographic elements which are particularly suitable with a number of commercially available laser diodes. In addition to providing sensitization to the desired wave-length range, the sensitizing dyes used in this invention exhibit a relatively narrow absorbance spectrum which helps image separation between layers of an element having multiple infrared-sensitive silver halide layers. A further important advantage of the dyes used in the present invention is that they exhibit an increased stability of their solutions during keeping.

The dyes of the present invention find particular utility when used for spectrally sensitizing to infrared radiation a silver halide emulsion layer in photographic elements that include at least one other infrared-sensitive silver halide layer. Preferred examples of said photographic elements are those comprising at least three silver halide emulsion layers on a substrate, each associated with different photographic colour image forming materials such as color couplers capable of forming dyes of different colors upon reaction with an oxidised color photographic developer, diffusing dyes, bleachable dyes or oxidizable leuco dyes, the three emulsion layers being sensitized to three different portions of the visible spectrum with at least one layer, preferably at least two layers, sensitized to radiation within the infrared region of the spectrum.

The infrared sensitizing dyes of the present invention are incorporated in the silver halide photographic emulsion in a content of $5 \times 10^{-7}$ mol to $5 \times 10^{-3}$ mol, preferably $1 \times 10^{-6}$ mol to $1 \times 10^{-3}$ mol, more preferably $2 \times 10^{-6}$ mol to $5 \times 10^{-4}$ mol, per mol of silver within the particular layer which is being sensitized by that dye.

The infrared sensitizing dyes to be used in the present invention can be directly dispersed in the emulsion. Alternatively, they may be first dissolved in a suitable solvent such as methyl alcohol, ethyl alcohol, methyl cellosolve, acetone, water, pyridine, or a mixture thereof to add them to the emulsion as a solution. Processes for adding the infrared sensitizing dyes to the photographic emulsion are described, for example, in U.S. Pat. Nos. 3,469,987, 3,676,147, 3,822,135, 4,199,360, and in U.S. Pat. Nos. 2,912,343, 3,342,605, 2,996,287 and 3,429,835. The aforesaid infrared sensitizing dyes may be uniformly dispersed in the silver halide emulsion before coating on a suitable support. Of course, this dispersing procedure may be conducted in any suitable step of preparing the silver halide emulsion.

Infrared sensitive silver halide color photographic elements for use in the present invention are preferably those described in U.S. Pat. No. 4,619,892, which is incorporated herein by reference. More preferably, the infrared sensitive silver halide color photographic elements for use in the present invention are those having all of the silver halide emulsion layers sensitized to different infrared regions of the electromagnetic spectrum. The order of these layers respect to the support, the difference in emulsion sensitivity among the layers and the sensitivity, contrast and D-max of each layer are preferably those described in said U.S. Pat. No. 4,619,892.

Any of the various types of photographic silver halide emulsions may be used in the practice of the present invention. Silver chloride, silver bromide, silver iodobromide, silver chlorobromide, silver chloroiodobromide, and mixtures thereof may be used, for example, dispersed in a hydrophilic colloid or carrier. Any configuration of grains, cubic, orthorombic, hexagonal, epitaxial, or tabular (high aspect ratio) grains may be used. The colloid may be partially hardened or fully hardened by any of the variously known photographic hardeners. Such hardeners are free aldehydes, aldehyde releasing compounds, triazines and diazines, aziridines, vinylsulfones, carbodiimides, and the like may be used, as described, for example, in U.S. Pat. Nos. 3,232,764, 2,870,013, 3,819,608, 3,325,287, 3,992,366, 3,271,175 and 3,490,911.

The silver halide photographic elements can be used to form dye images therein through the selective formation of dyes. The photographic elements described above for forming silver images can be used to form dye images by employing developers containing dye image formers, such as color couplers, as described, for example, in U.S. Pat. Nos. 3,111,864, 3,002,836, 2,271,238, 2,236,598, 2,950,970, 2,592,243, 2,343,703, 2,376,380, 2,369,489, 2,899,306, 3,152,896, 2,115,394, 2,252,718, 2,108,602, and 3,547,650. In this form the developer contains a color developing agent (e.g., a primary aromatic amine which in its oxidized form is capable of reacting with the coupler to form the image dye). Also, instant self-developing diffusion transfer film can be used as well as photothermographic color film or paper using silver halide in catalytic proximity to reducable silver sources and leuco dyes.

The dye-forming couplers can be incorporated in the photographic elements, as illustrated by Schneider et al., *Die Chemie,* Vol. 57, 1944, p. 113, and in U.S. Pat. Nos. 2,304,940, 2,269,158, 2,322,027, 2,376,679, 2,801,171, 2,748,141, 2,772,163, 2,835,579, 2,533,514, 2,353,754, 3,409,435 and Chen, Research Disclosure, Vol. 159, July 1977, Item 15930. The dye-forming couplers can be incorporated in different amounts to achieve differing photographic effects. For example, GB Pat. No. 923,045 and U.S. Pat. No. 3,843,369 teach limiting the concentration of coupler in relation to the silver coverage to less than normally employed amounts in faster and intermediate speed emulsion layers.

The dye-forming couplers are commonly chosen to form subtractive primary (i.e., yellow, magenta and cyan)image dyes and are nondiffusible, colorless couplers, such as two and four equivalent couplers of the open chain ketomethylene, pyrazolone, pyrazolotriazole, pyrazolobenzimidazole, phenol and naphthol type hydrophobically ballasted for incorporation in high-boiling organic (coupler) solvents. Such couplers are illustrated in U.S. Pat. Nos. 2,423,730, 2,772,162, 2,895,826, 2,710,803, 2,407,207, 3,737,316, 2,367,531, 2,772,161, 2,600,788, 3,006,759, 3,214,437, 3,253,924, 2,875,057, 2,908,573, 3,043,892, 2,474,293, 2,407,210, 3,062,653, 3,265,506, 3,384,657, 2,343,703, 3,127,269, 2,865,748, 2,933,391, 2,865,751, 3,725,067, 3,758,308, 3,779,763, 3,785,829, 3,762,921, 3,983,608, 3,311,467, 3,408,194, 3,458,315, 3,447,928, 3,476,563, 3,419,390, 3,419,391, 3,519,429, 3,222,176, 3,227,550, in GB Pat. Nos. 969,921, 1,241,069, 1,011,940, 975,928, 1,111,554, 1,248,924, and in CA Pat. No. 726,651. Dye-forming couplers of differing reaction rates in single or separate layers can be employed to achieve desired effects for specific photographic applications.

The dye-forming couplers upon coupling can release photo-graphically useful fragments, such as development inhibitors or accelerators, bleach accelerators, developing agents, silver halide sol-vents, toners, hardeners, fogging agents, antifoggants, competing couplers, chemical or spectral sensitizers and desensitizers. Development inhibitor-releasing (DIR) couplers are illustrated in U.S. Pat. Nos. 3,148,062, 3,227,554, 3,733,201, 3,617,291, 3,703,375, 3,615,506, 3,265,506, 3,620,745, 3,632,345, 3,869,291, 3,642,485, 3,770,436, 3,808,945, and in GB Pat. Nos. 1,201,110 and 1,236,767. Dye-forming couplers and nondye-forming compounds which upon coupling release a variety of photographically useful groups are described in U.S. Pat. No. 4,248,962. DIR compounds which do not form dye upon reaction with oxidized color developing agents can be employed, as illustrated in U.S. Pat. Nos. 3,928,041, 3,958,993, 3,961,959, 4,049,455, 4,052,213 and in German OLS Nos. 2,529,350, 2,448,063 and 2,610,546. DIR compounds which oxidatively cleave can be employed, as illustrated in U.S. Pat. Nos. 3,379,529, 3,043,690, 3,364,022, 3,297,445 and 3,287,129. Silver halide emulsions which are relatively light insensitive, such as Lippmann emulsions, having been used as interlayers or overcoat layers to prevent or control the migration of development inhibitor fragments as described in U.S. Pat. No. 3,892,572 can be employed.

The photographic elements can incorporate colored dye-forming couplers, such as those employed to form integral masks for negative color images, as illustrated in U.S. Pat. Nos. 2,449,966, 2,521,908, 3,034,892, 3,476,563, 3,519,429, 2,543,691, 3,028,238, 3,061,432, and/or competing couplers, as illustrated in U.S. Pat. Nos. 3,876,428, 3,580,722, 2,998,314, 2,808,329, 2,742,832 and 2,689,793.

As previously noted, the color provided in the image produced by exposure of each of the differently sensitized silver halide emulsion layers does not have to be produced by color coupler reaction with oxidized color developers. A number of other color image forming mechanisms well known in the art can also be used. Amongst the commercially available color image forming mechanisms are the diffusion transfer of dyes, dye-bleaching, and leuco dye oxidation. Each of these procedures is used in commercial products, is well understood by the ordinary skilled photographic artisan, and is used with silver halide emulsions. Multicolor elements using these different technologies are also commercially available. Converting the existing commercially available systems to the practice of the present invention could be done by routine redesign of the sensitometric parameters of the system and/or the addition of intermediate filter layers as described in U.S. Pat. No. 4,619,892. For example, in a conventional instant color dye-diffusion transfer element, the sensitivity of the various layers and/or the arrangement of filter layers between the silver halide emulsion layers would be directed by the teachings of the above US patent, the element otherwise remaining the same. This would be true with either negative-acting or positive-acting silver halide emulsions in the element. The only major, and fairly apparent, consideration that must be given to such construction is to insure that the placement of any filter layers does not prevent transfer of the diffusion dye to a receptor layer within the element. Using a filter which is not a barrier layer between the receptor layer and the dye-containing layer is the simplest way to address that consideration. Such a layer should not prevent migration of the diffusion dye across the filter layer.

These types of imaging systems are well known in the art. Detailed discussions of various dye transfer, diffusion processes may be found for example in *A Fundamentally New Imaging Technology for Instant Photography*, W. T. Harison, Jr., Photographic Science and Engineering, Vol. 20, No. 4, July/August 1976, and Neblette's *Handbook of Photography and Reprography, Materials, Processes and Systems*, 7th Edition, John. M. Stunge, van Nostrand Reinhold Company, N.Y., 1977, pp. 324–330 and 126. Detailed discussion of dye-bleach color imaging systems are found for example in *The Reproduction of Colour*, 3rd Ed., R. W. G. Hunt, Fountain Press, London, England, 1975, pp.325–330; and *The Theory of the Photographic Process*, 4th Ed., Mees and James, Macmillan Publishing Co., Inc., N.Y., 1977, pp. 363–366. Pages 366–372 of Mees and James, supra, also discuss dye-transfer processes in great detail. Leuco dye oxidation in silver halide systems are disclosed in such literature as U.S. Pat. Nos. 4,460,681, 4,374,821, and 4,021,240. Diffusion photothermographic color image forming systems such as those disclosed in GB Pat. Appln. No. 3,100,458 are also useful in the practice of the present invention.

The photographic elements can include image dye stabilizers. Such image dye stabilizers are illustrated in U.S. Pat. Nos. 3,432,300, 3,698,909, 3,574,627, 3,573,050, 3,764,337, and 4,042,394 and in GB Pat. No. 1,326,889.

Filter dyes can be included in the photographic elements. Said dyes must be selected on the basis of their radiation filtering characteristics to insure that they filter the appropriate wavelengths. Filter dyes and their methods of incorporation into the photographic elements are well documented in the literature such as U.S. Pat. Nos. 4,440,852, 3,671,648, 3,423,207, and 2,895,955, GB Pat. No. 485,624, and Research Disclosure, Vol. 176, December 1978, Item 17643. Filter dyes can be used in the practice of the present invention to provide room-light handleability to the elements. Dyes which will not allow transmission of radiation having wavelengths shorter than the shortest wavelength to which one of the emulsion layers has been sensitized can be used in a layer above one or more (preferably all) of the emulsion layers. The cut-off filter dye preferably does not transmit light more than approximately 50 nm less than the shortest wavelength to which any of the emulsion layers have been sensitized. Filter dyes should also be provided with non-fugitive (i.e., non-migratory) characteristics and should be decolorizable (by bleaching in developer or heat, for example) or leachable (e.g., removed by solvent action of any baths).

Other conventional photographic addenda such as coating aids, antistatic agents, acutance dyes, antihalation dyes and layers, antifoggants, latent image stabilizers, supersentizers, antikinking agents, high intensity reciprocity failure reducers, and the like may also be present.

The following examples illustrate the preparation of tricarbocyanine dyes and non-limiting examples of preferred embodiments of the present invention.

EXAMPLE 1

Synthesis of Dyes a) Comparison Dye A

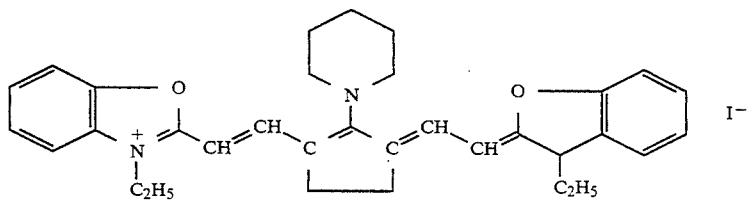

This dye was prepared according to the general method described in U.S. Pat. No. 4,933,269. $\gamma max = 641$ nm (MeOH).

b) Comparison Dye B

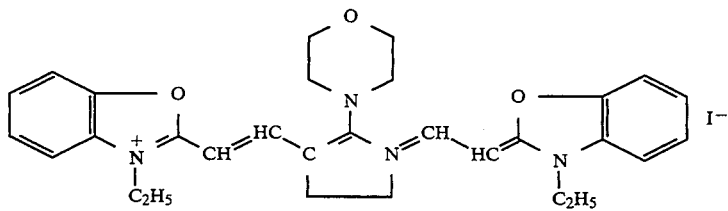

This dye was prepared according to the general method described in U.S. Pat. No. 4,933,269. γmax=661 nm (MeOH).

c) Dye 1

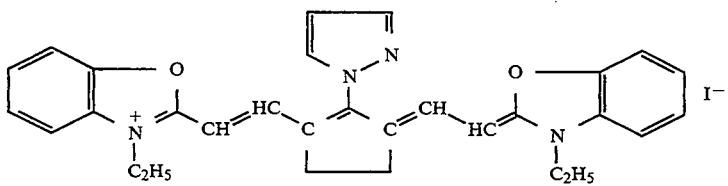

This dye was prepared according to the general method described in U.S. Pat. No. 4,933,269. γmax=741 nm (MeOH).

This example shows the bathochromic effect on the absorption maximum caused by heterocyclic aromatic ring attached to the meso carbon atom of the methine linkage in tricarbocyanine dyes.

EXAMPLE 2

Synthesis of dyes a) Comparison Dye C

This dye was prepared according to the general method described in U.S. Pat. No. 4,959,294. γmax=743 nm (MeOH).

b) Comparison Dye D

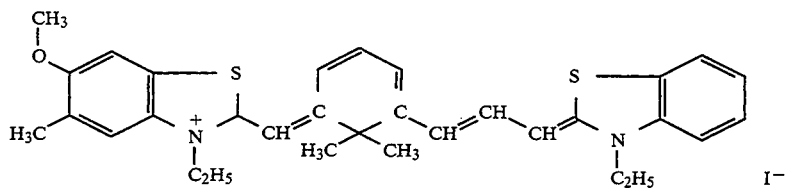

This dye was prepared according to the general method described in U.S. Pat. No. 4,515,888, γmax=760 nm (MeOH).

c) Comparison Dye E

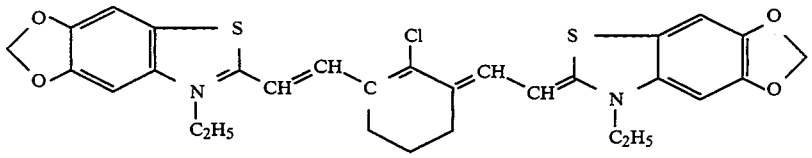

This dye was prepared according to the general method described in U.S. Pat. No. 4,959,294. γmax=728 nm (MeOH).

d) Comparison Dye F

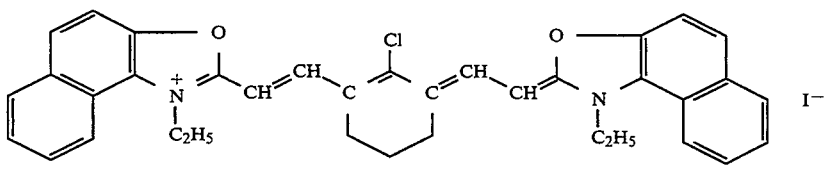

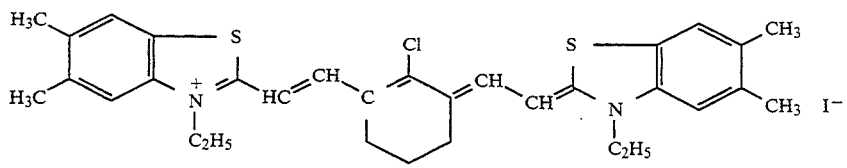

This dye was prepared according to the general method described in U.S. Pat. No. 742,447. γmax=828 nm (MeOH).

e) Dye 2

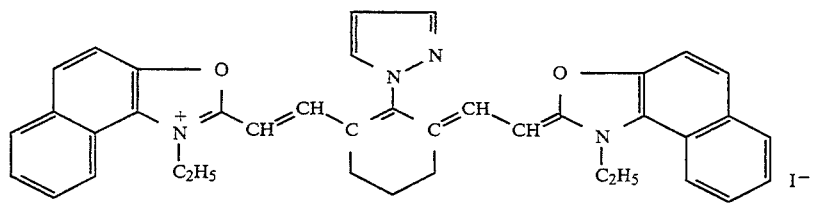

3-Ethyl-2-methyl-naphthothiazolium iodide (2.32 g), 3-hydroxy-methyl-idene-2-(1-pyrazolyl)-cyclohex-1-ene-1-aldehyde (0.7 g) and diiso-propylethylamine (3.5 ml) were combined in phenol (10 ml) and heated at 100° C. for 6 hours. The solution was allowed to cool and was poured into ethylacetate (100 ml). The separated solid was crystallised from methanol affording 0.7 g of dye. γmax=754 nm (MeOH).

f) Dye 3

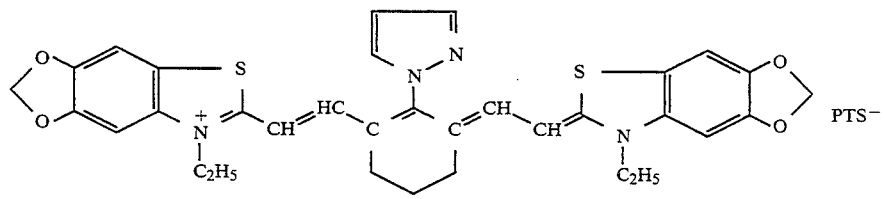

3-Ethyl-2-methyl-5,6-dioxymethylene-benzo-thiazolium p-toluensul-fonate (1.92 g), 3-hydroxyme-thylidene-2-(1-pyrazolyl)-cyclohex-1-ene-1-al-dehyde (0.5 g) and triethylamine (1 ml) where combined in methanol (10 ml) and heated at reflux for 30 minutes. The mixture was allowed to cool and the separated solid was collected, and washed with methanol to afford 0.5 g of dye. γmax=832 nm (MeOH).

g) Dye 7

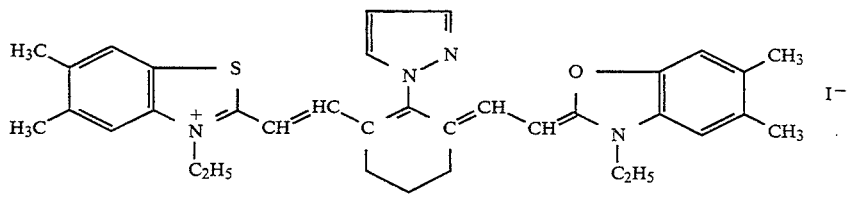

The dye was prepared following the same procedure for preparing dye 2. γmax=733 nm (MeOH).

EXAMPLE 3

To 75 g of an AgCl emulsion (having 0.45 μm average grain size, 9.1% Ag coverage and 5.47% gelatin coverage) were added 291 g of an oil in water dispersion containing 65 g of coupler M, 0.295 g of compound A, 1.14% of compound B and 3% of gelatin. The composition was diluted with 227 ml of water and added with 3% of gelatin. 6.3 ml of 0.1N KBr were added under stirring. Then, 0.096 mmole/mole Ag of spectral sensitizing dye reported in the following table, 0.63 mole/mole Ag of stabilizer ST, and 550 mg/mole Ag of supersensitizer SS were added in the order to the composition. The composition was then maintained at 38° C. for 40 minutes. After this time, 1.75 ml of a 0.1% w/w solution in methanol of compound C and a surfactant were added. The composition was coated onto a conventional photographic paper base at a coverage of 0.28 g/m². The photosensitive layer was overcoated with a protective layer comprising gelatin, a surfactant and a vinylsulfonyl hardener.

After conditioning for 24 hours at 33° C., each coating was exposed to an 835 nm laser light at different exposition levels, developed in a Kodak RA-4 processing line and sensitivity was measured by conventional densitometric methods. To determine the wavelenghth of maximum sensitization, each coating was given 8 seconds exposure on a wedge spectrographic instrument covering a wavelength range from 550 to 950 nm. The instrument contained a step tablet ranging in density from 0 to 3 density unit in 0.15 density step and a Wratten TM W29 red filter. From developed images, spectrophotometric curves were generated and the half-band width (HBW) was measured. HBW is the width in nanometers of the spectrophotometric curve at one half the difference between maximum density and dye fog. The narrower the HBW, the lower is the unwanted sensitivity in regions of the spectrum other than the emission wavelength of the laser diode and the better color separation between layers of an element having multiple infrared-sensitive layers. Sensitivity (Speed, expressed in IogE), wavelength of maximum sensitization (Lambda max, in nanometers) and spectral width (HBW, in nanometers) are reported in the following Table 1:

TABLE 1

| Coating | Dye | Speed | λmax | HBW |
|---|---|---|---|---|
| 1 | E (Comp.) | 2.59 | 818 | 135 |
| 2 | D (Comp.) | 1.68 | 801 | 48 |
| 3 | 2 (Inv.) | 2.64 | 815 | 50 |

The dye of the present invention (Dye 2) results in a higher efficiency of sensitization than the comparison dye (Dye D), and a narrower spectral width than the comparion dye (Dye E).

Coupler M

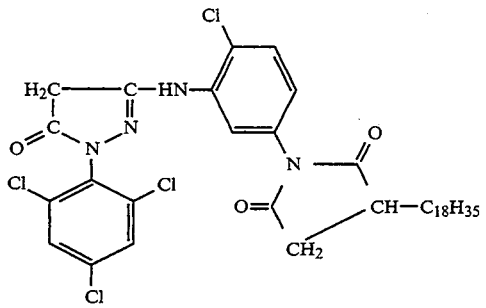

Compound A

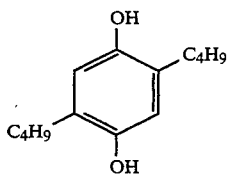

Compound B

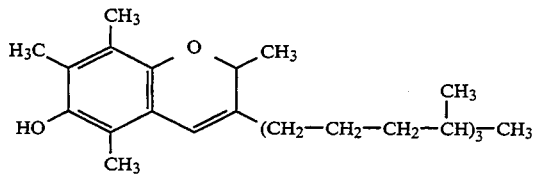

Stabilizer ST

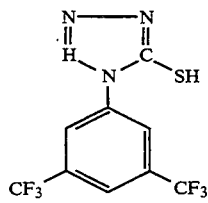

Supersensitizer SS

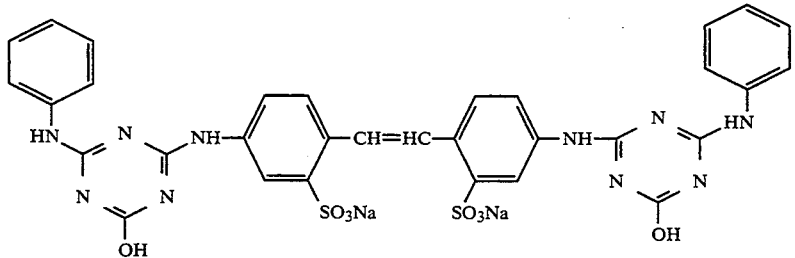

EXAMPLE 4

1/2000 w/w solutions of each dye in a 9:1 (vol:vol) MeOH/phenylcellosolve solvent mixture were kept in the dark at room temperature. The stability of the solutions was determined by measuring the time (in hours) necessary to have an optical density below 95% of the original optical density. In the following Table 2 values of stability are reported.

TABLE 2

| Dye | Stability (hours) |
|---|---|
| E (comp.) | 36 |
| D (comp.) | 24 |
| F (comp.) | 24 |
| 2 (inv.) | 72 |
| 3 (inv.) | 72 |

When compared to other dyes, the present dyes have a substantially better keeping stability in solution.

EXAMPLE 5

Sensitizing dyes for laser exposure at 780 nm were evaluated using the same conditions as in Example 3, with the following variations:

| | |
|---|---|
| Sensitizing Dye | 0.061 mmole/mole Ag |
| Stabilizer ST | 0.91 mmole/mole Ag |
| Supersensitizer SS | 1.144 mg/mole Ag |
| Coupler Y | 2.05% by weight of the final coating composition |
| Gelatin | 4.56% by weight of the final coating composition |
| Ag | 1.16% by weight of the final coating composition |

The coating speed was adjusted to obtain a silver coating weight of 0.34 g/m².

After conditioning as in Example 3, each coating was exposed at a 780 nm lased light of different intensity and processed in Kodak RA-4 processing chemistry. Speed and maximum sensitization are repoded in the following Table 3:

TABLE 3

| Dye | Speed | λmax |
|---|---|---|
| G (comp.) | 2.25 | 760 |
| 7 (inv.) | 2.40 | 769 |

It can be seen from the Table that the dye of the invention provide higher sensitivity in the infrared region of the spectrum compared with the prior art dye.

Coupler Y

We claim:

1. A silver halide photographic element comprising a support and at least one silver halide emulsion layer, characterized in that said at least one silver halide emulsion layer is spectrally sensitized to infrared radiation with a tricarbocyanine dye having the formula:

$$\begin{array}{c} \overset{Z_1}{\underset{R_1}{N+}} = C - CH = CH - C = \overset{Z_3}{\underset{Q}{C}} - C = CH - CH = C - \overset{Z_2}{\underset{R_2}{N}} \\ (X^-)_{n-1} \end{array}$$

wherein,
  $Z_1$ and $Z_2$ each independently represents the atoms necessary to complete a thiazole nucleus or an oxazole nucleus,
  $Z_3$ forms a non-fused 5-membered N-containing aromatic ring,
  Q represents the atoms necessary to complete a 5- or 6-membered carbocyclic ring,
  $R_1$ and $R_2$ each independently represents an alkyl group,
  $X^-$ represents an anion, and
  n represents an integer of 1 to 2, provided that n is 1 when the dye forms an intramolecular salt.

2. The photographic element of claim 1, further comprising at least one additional silver halide emulsion layer sensitised to infrared radiation and having a maximum sensitivity which is different from said at least one silver halide emulsion layer.

3. The photographic element of claim 1, comprising a support, and on one side of said support at least three silver halide emulsion layers, each of said silver halide emulsion layers being associated with a different colour photographic coupler, each emulsion layer being sensitized to different region of the electromagnetic spectrum and at least two emulsion layers being sensitized to radiation within the infrared region of the electromagnetic spectrum, at least one silver halide emulsion layer being spectrally sensitized with said tricarbocyanine dye.

4. The photographic element of claim 1, wherein $Z_3$ represents the atoms necessary to complete a 5-membered N-containing aromatic ring selected in the group consisting of pyrazole, triazole, imidazole and pyrrole.

5. The photographic element of claim 1, wherein the tricarbocyanine dye is present in an amount of from $5 \times 10^{-7}$ mol to $5 \times 10^{-3}$ mol per mol of silver.

6. A silver halide photographic element comprising a sion layer is spectrally sensitized to infrared radiation with a tricarbocyanine dye having the formula:

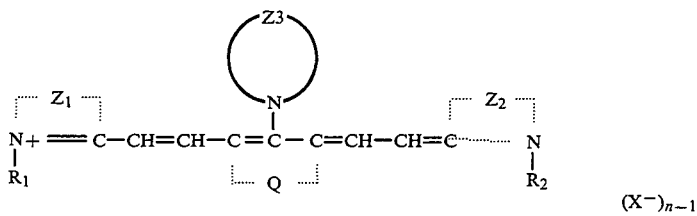

wherein,

- $Z_1$ and $Z_2$ each independently represents the atoms necessary to complete a thiazole nucleus or an oxazole nucleus,
- $Z_3$ forms a non-fused 5-membered N-containing aromatic ring selected from the group consisting of pyrazole, triazole, imidazole or pyrrole ring,
- Q represents the atoms necessary to complete a 5- or 6-membered carbocyclic ring,
- $R_1$ and $R_2$ each independently represents an alkyl group,
- $X^-$ represents an anion, and
- n represents an integer of 1 to 2, provided that n is 1 when the dye forms an intramolecular salt.

7. The photographic element of claim 6 wherein $Z_3$ has substituents selected from the group consisting of hydroxy, halogen, carboxylate of 1 to 4 carbon atoms, amido, and sulfonamido.

8. The photographic element of claim 6 wherein said element also contains at least a second silver halide emulsion layer sensitized to infrared radiation and said second silver halide emulsion layer has a wavelength of maximum sensitivity which is different from that of said at least one silver halide emulsion layer.

9. The photographic element of claim 6 comprising a support, and on one side of said support at least three silver halide emulsion layers, each of said silver halide emulsion layers being associated with a different color photographic coupler, each emulsion layer being sensitized to a different region of the electromagnetic spectrum and at least two emulsion layers being sensitized to radiation within the infrared region of the electromagnetic spectrum, at least one of said each of said silver halide emulsion layers being spectrally sensitized with said tricarbocyanine dye.

10. The photographic element of claim 6 wherein the tricarbocyanine dye is present in an amount of from $5 \times 10^{-7}$ mol to $5 \times 10^{-3}$ mol per mol of silver.

* * * * *

UNITED STATES PATENT AND TRADEMARK OFFICE
CERTIFICATE OF CORRECTION

PATENT NO. : 5,441,858

DATED : August 15, 1995

INVENTOR(S) : Delprato et al.

It is certified that error appears in the above-indentified patent and that said Letters Patent is hereby corrected as shown below:

Column 14, line 67, delete "$\gamma max$" and insert --$\lambda max$--.

Column 15, line 14, delete "$\gamma max$" and insert --$\lambda max$--.

Column 15, line 40, delete "$\gamma max$" and insert --$\lambda max$--.

Column 16, line 14, delete "$\gamma max$" and insert --$\lambda max$--.

Column 16, line 40, delete "$\gamma max$" and insert --$\lambda max$--.

Column 16, line 54, delete "$\gamma max$" and insert --$\lambda max$--.

Column 17, line 10, delete "$\gamma max$" and insert --$\lambda max$--.

Column 17, line 30, delete "$\gamma max$" and insert --$\lambda max$--.

Column 17, line 49, delete "$\gamma max$" and insert --$\lambda max$--.

Column 17, line 62, delete "$\gamma max$" and insert --$\lambda max$--.

UNITED STATES PATENT AND TRADEMARK OFFICE
CERTIFICATE OF CORRECTION

PATENT NO. : 5,441,858
DATED : August 15, 1995
INVENTOR(S) : Delprato et al.

It is certified that error appears in the above-indentified patent and that said Letters Patent is hereby corrected as shown below:

Column 20, under the chemical formula "Stabilizer ST", in the first column, delete

"N
‖
H"

and insert

--N
‖
N--.

Signed and Sealed this

Twentieth Day of February, 1996

Attest:

BRUCE LEHMAN

*Attesting Officer*    *Commissioner of Patents and Trademarks*